(12) United States Patent
Durney et al.

(10) Patent No.: US 6,877,349 B2
(45) Date of Patent: Apr. 12, 2005

(54) METHOD FOR PRECISION BENDING OF SHEET OF MATERIALS, SLIT SHEETS FABRICATION PROCESS

(75) Inventors: Max W. Durney, San Francisco, CA (US); Alan D. Pendley, Petaluma, CA (US)

(73) Assignee: Industrial Origami, LLC, San Francisco, CA (US)

(*) Notice: Subject to any disclaimer, the term of this patent is extended or adjusted under 35 U.S.C. 154(b) by 0 days.

(21) Appl. No.: 10/256,870

(22) Filed: Sep. 26, 2002

(65) Prior Publication Data

US 2003/0037586 A1 Feb. 27, 2003

Related U.S. Application Data

(63) Continuation-in-part of application No. 09/640,267, filed on Aug. 17, 2000, now Pat. No. 6,481,259.

(51) Int. Cl.[7] .............................................. B21D 28/00
(52) U.S. Cl. ...................... 72/324; 72/379.2; 428/136
(58) Field of Search ...................... 72/324, 335, 379.2, 72/129, 185; 493/399, 363, 596, 352, 356, 361; 52/658; 425/136

(56) References Cited

U.S. PATENT DOCUMENTS

| | | | |
|---|---|---|---|
| 975,121 A | | 11/1910 | Carter |
| 1,295,769 A | * | 2/1919 | Kux .............................. 72/129 |
| 1,405,042 A | | 1/1922 | Kraft |
| 1,698,891 A | | 1/1929 | Overbury |
| 2,127,618 A | * | 8/1938 | Riemenschneider ........ 228/151 |

(Continued)

FOREIGN PATENT DOCUMENTS

| | | |
|---|---|---|
| DE | 298 18 909 U1 | 2/1999 |
| GB | 2 129 339 A | 5/1984 |
| JP | 52-068848 | 6/1977 |
| JP | 53-070069 | 6/1978 |
| JP | 55-022468 | 2/1980 |
| JP | 55-055222 | 4/1980 |
| JP | 59-006116 | 1/1984 |
| JP | 02-065416 | 5/1990 |
| JP | 02-165817 | 6/1990 |
| JP | 02-192821 | 7/1990 |
| JP | 02-258116 | 10/1990 |
| JP | 04-033723 | 2/1992 |
| JP | 04-091822 | 3/1992 |
| JP | 05-261442 | 10/1993 |
| JP | 07-148528 | 6/1995 |

(Continued)

OTHER PUBLICATIONS

Publication "Office dA" by Contemporary World Architects, pp. 15, 20–35, 2000.
Patent Abstracts of Japan, vol. 004, No. 053 (M–008), Apr. 19, 1980.
Patent Abstracts of Japan, vol. 015, No. 006 (M–1066), Jan. 8, 1991.

*Primary Examiner*—Daniel C. Crane
(74) *Attorney, Agent, or Firm*—Dorsey & Whitney LLP

(57) ABSTRACT

A method for precision bending of a sheet of material (41, 241, 341, 441) along a bend line (45, 245, 345, 445) and the resulting sheet are disclosed. A method includes a step of forming longitudinally extending slits (43, 243, 343, 443) through the sheet of material in axially spaced relation to produce precise bending of the sheet (41, 241, 341, 441) along the bend line (45, 245, 345, 445) with edges (257, 457) engaged and supported on faces (255, 455) of the sheet material on opposite sides of the slits. The edge-to-face contact produces bending along a virtual fulcrum position in superimposed relation to the bend line (45, 245, 345, 445). Several slit embodiments (43, 243, 343, 443) suitable for producing edge-to-face engagement support and precise bending are disclosed, as is the use of the slit sheets to enhance various fabrication techniques.

49 Claims, 9 Drawing Sheets

U.S. PATENT DOCUMENTS

| | | | |
|---|---|---|---|
| 2,560,786 A | * | 7/1951 | Wright et al. .................. 72/324 |
| 3,258,380 A | | 6/1966 | Fischer et al. |
| 3,341,395 A | * | 9/1967 | Weber ........................ 428/134 |
| 3,353,639 A | | 11/1967 | Andriussi |
| 3,756,499 A | | 9/1973 | Giebel et al. |
| 3,788,934 A | | 1/1974 | Coppa |
| 3,854,859 A | | 12/1974 | Sola |
| 3,938,657 A | | 2/1976 | David |
| 3,963,170 A | | 6/1976 | Wood |
| 4,215,194 A | | 7/1980 | Sheperd |
| 4,289,290 A | | 9/1981 | Miller |
| 4,559,259 A | | 12/1985 | Cetrelli |
| 4,628,661 A | | 12/1986 | St Louis |
| 4,837,066 A | | 6/1989 | Quinn et al. |
| 5,148,900 A | | 9/1992 | Mohan |
| 5,157,852 A | | 10/1992 | Patrou et al. |
| 5,225,799 A | | 7/1993 | West et al. |
| 5,239,741 A | | 8/1993 | Shamos |
| 5,390,782 A | | 2/1995 | Sinn |
| 5,524,396 A | | 6/1996 | Lalvani |
| 5,568,680 A | | 10/1996 | Parker |
| 5,692,672 A | | 12/1997 | Hunt |
| 5,701,780 A | | 12/1997 | Ver Meer |
| 5,709,913 A | | 1/1998 | Andersen et al. |
| 5,789,050 A | * | 8/1998 | Kang ........................ 428/42.3 |
| 5,885,676 A | | 3/1999 | Lobo et al. |
| 6,132,349 A | | 10/2000 | Yokoyama |
| 6,210,037 B1 | | 4/2001 | Brandon, Jr. |
| 6,412,325 B1 | | 7/2002 | Croswell |
| 6,481,259 B1 | | 11/2002 | Durney |
| 6,599,601 B1 | * | 7/2003 | Fogle et al. ................ 428/42.3 |
| 6,640,605 B1 | | 11/2003 | Gitlin et al. |
| 6,643,561 B1 | | 11/2003 | Torvinen |
| 6,658,316 B1 | | 12/2003 | Mehta et al. |
| 2001/0010167 A1 | | 8/2001 | Leek |
| 2002/0184936 A1 | | 12/2002 | Gitlin et al. |
| 2003/0037586 A1 | | 2/2003 | Durney et al. |

FOREIGN PATENT DOCUMENTS

| | | |
|---|---|---|
| JP | 08-224619 | 9/1996 |
| JP | 10-085837 | 4/1998 |
| JP | 11-123458 | 5/1999 |
| JP | 11-188426 | 7/1999 |
| WO | WO97/24221 | 7/1997 |

* cited by examiner

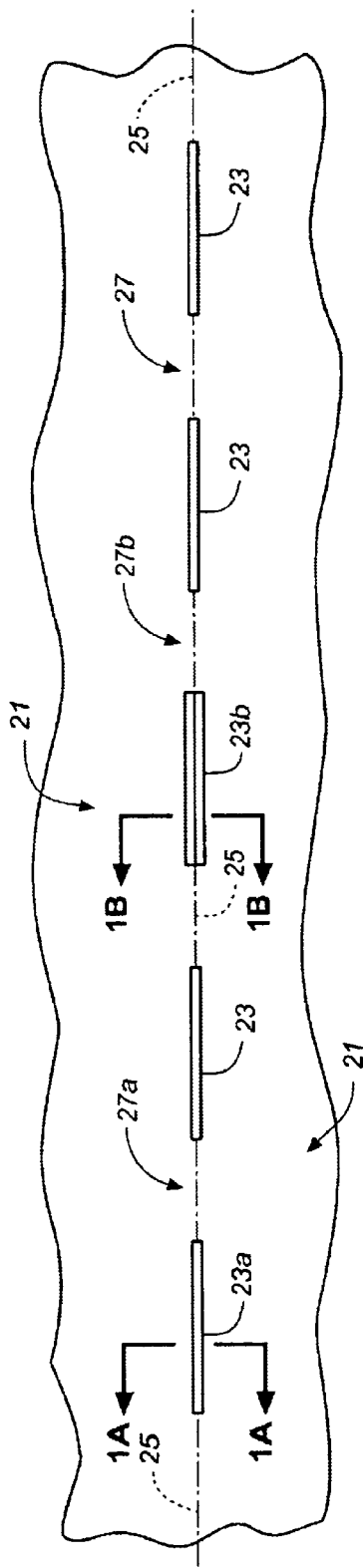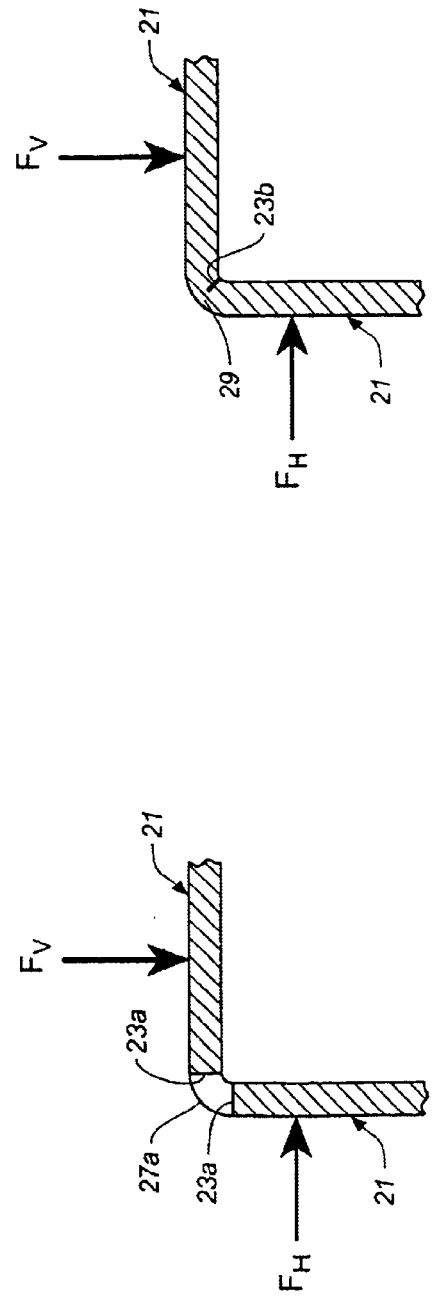
FIG._1 (PRIOR ART)
FIG._1A (PRIOR ART)
FIG._1B (PRIOR ART)

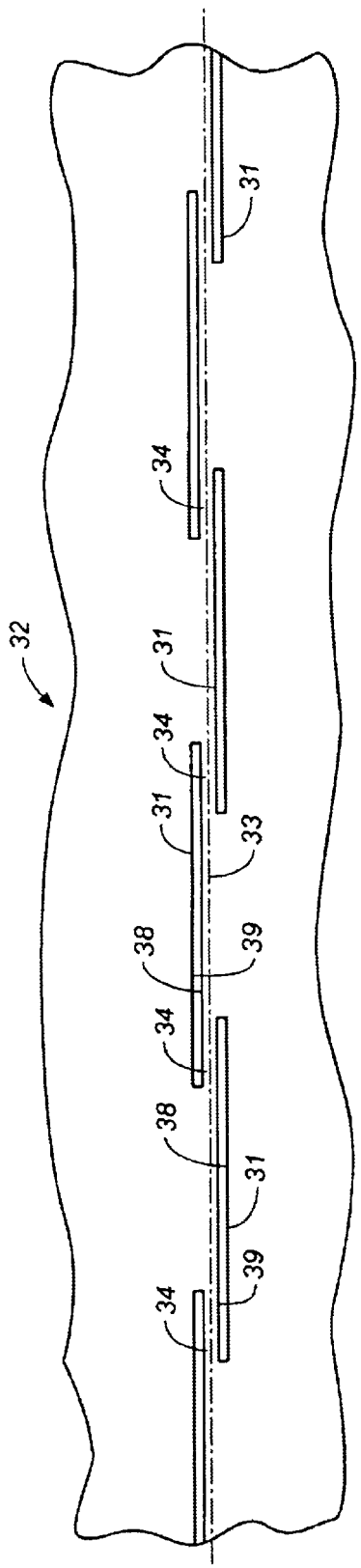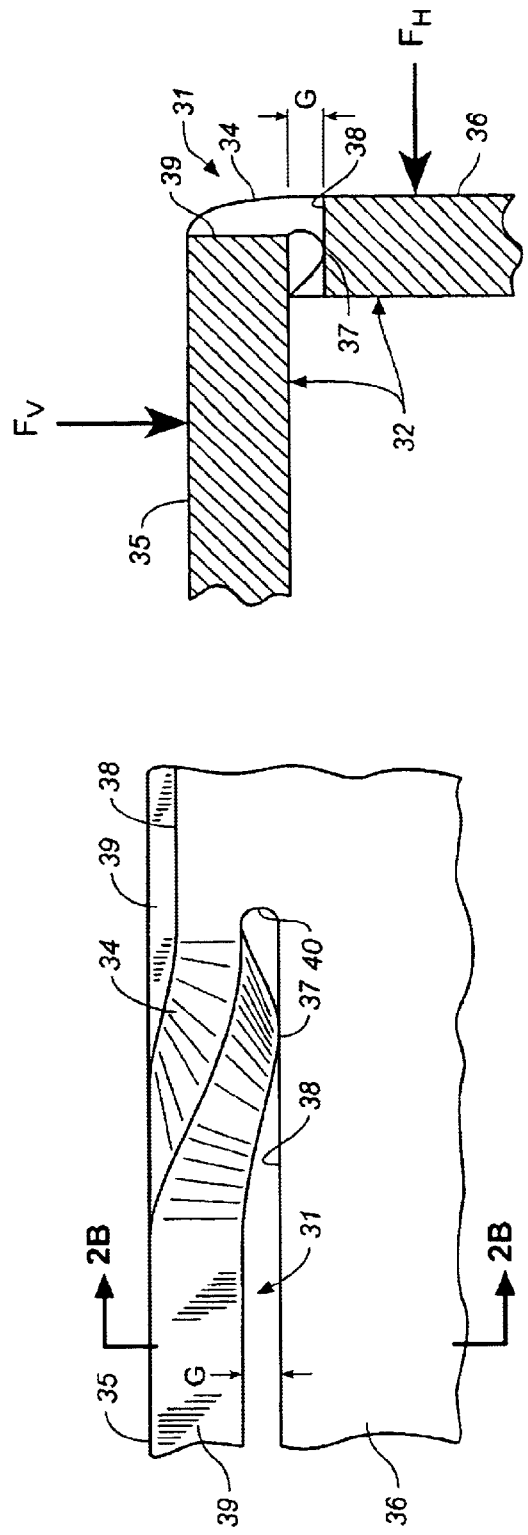
FIG._2 (PRIOR ART)
FIG._2A (PRIOR ART)
FIG._2B (PRIOR ART)

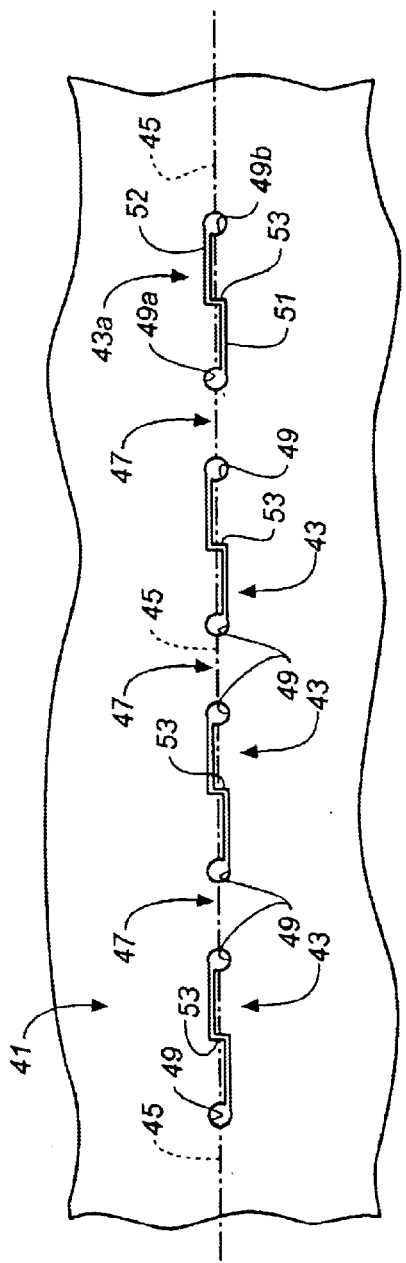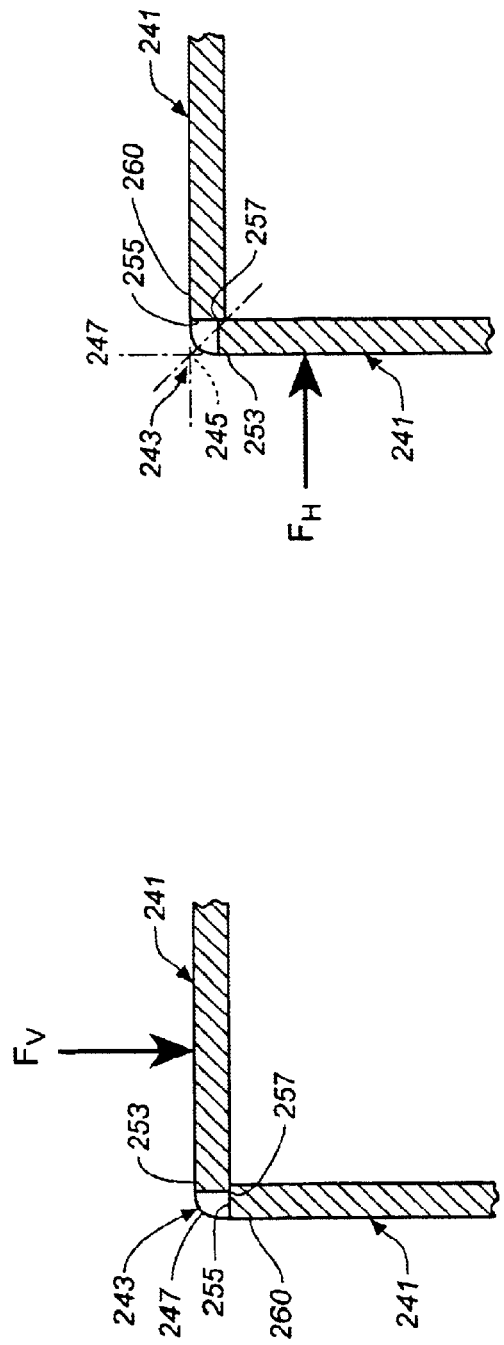

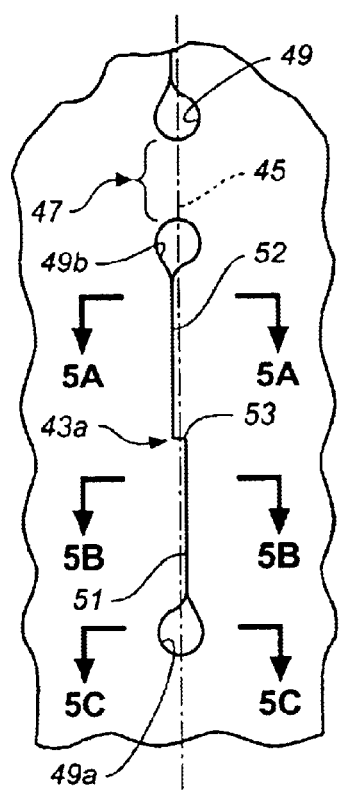
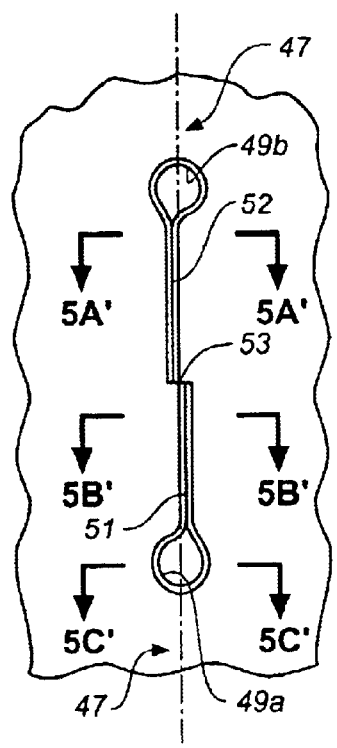
FIG._4A
FIG._4B
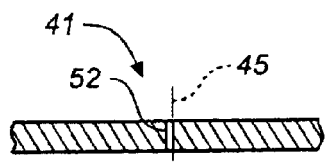
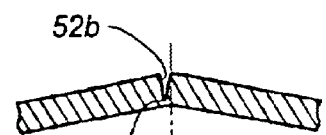
FIG._5A
FIG._5A'
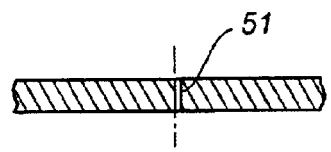
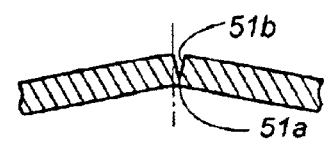
FIG._5B
FIG._5B'
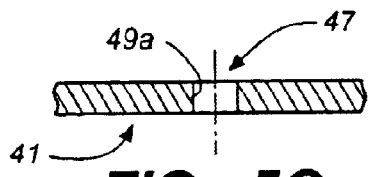
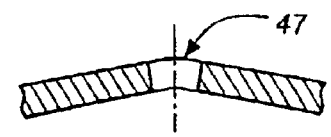
FIG._5C
FIG._5C'

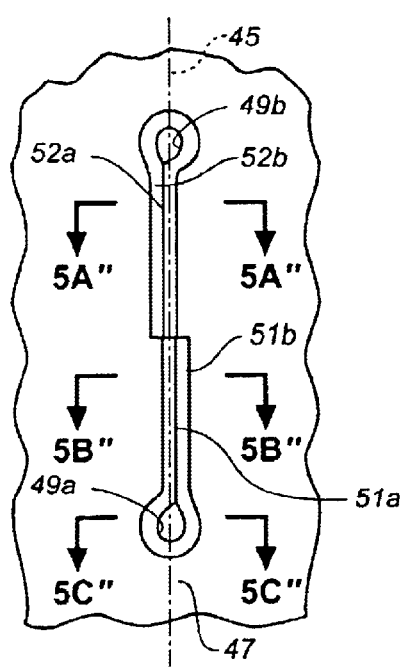
FIG._4C
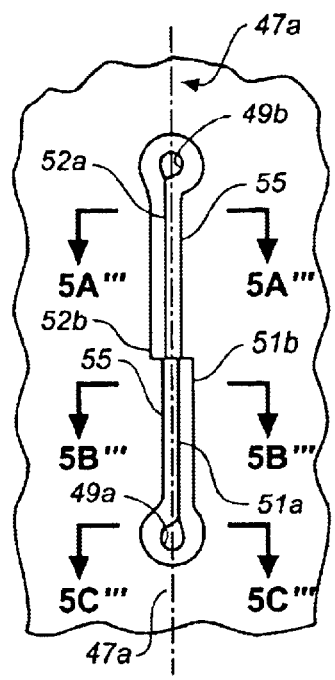
FIG._4D
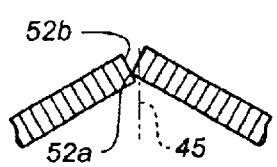
FIG._5A"
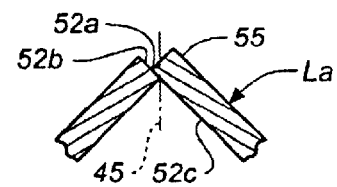
FIG._5A'''
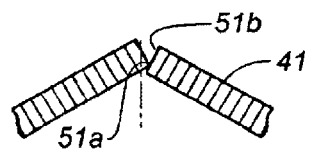
FIG._5B"
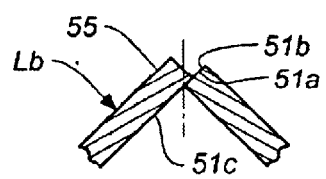
FIG._5B'''
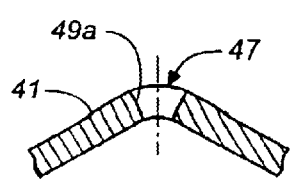
FIG._5C"
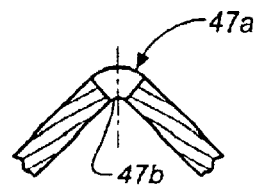
FIG._5C'''

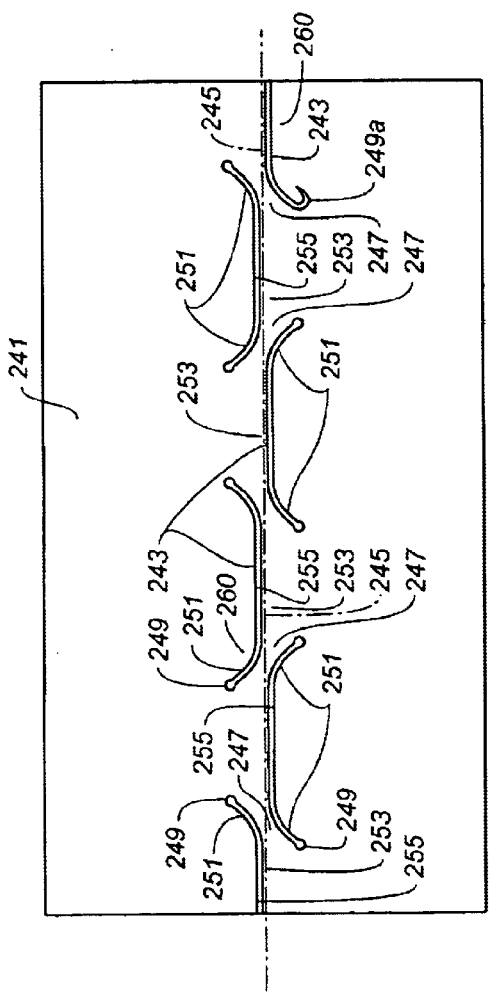
FIG._6
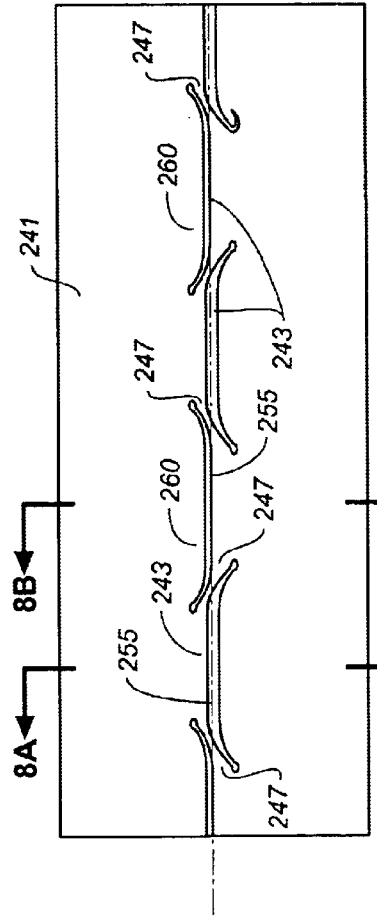
FIG._7
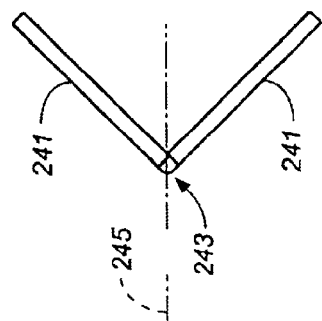
FIG._8

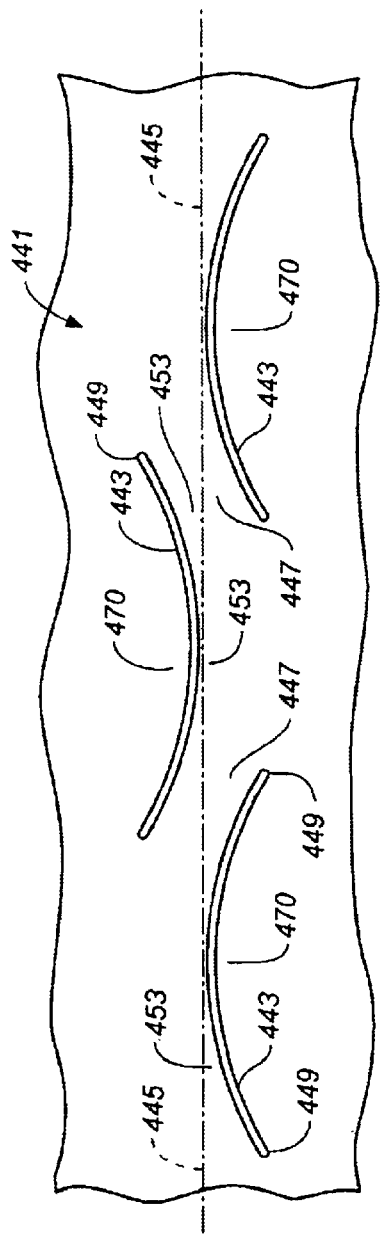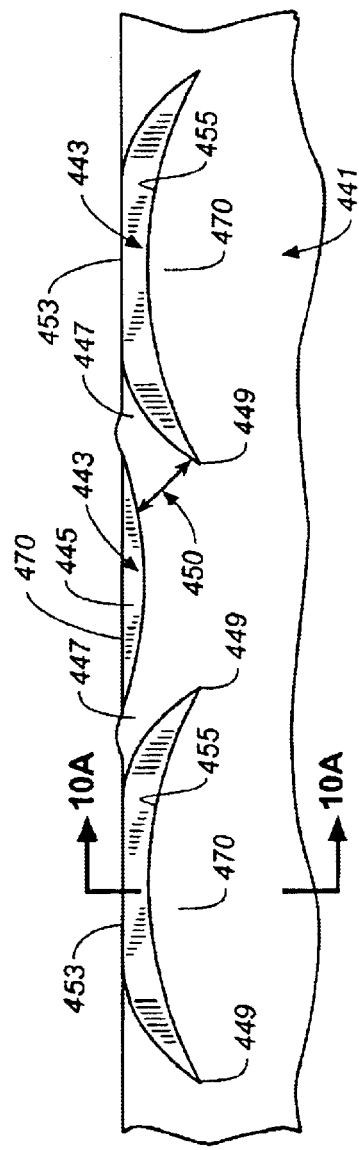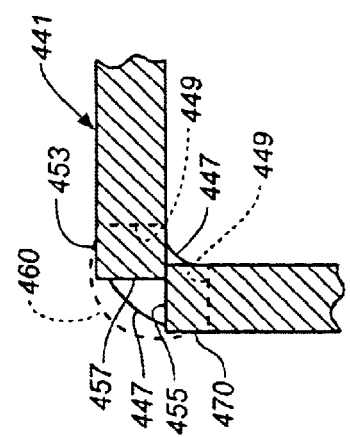

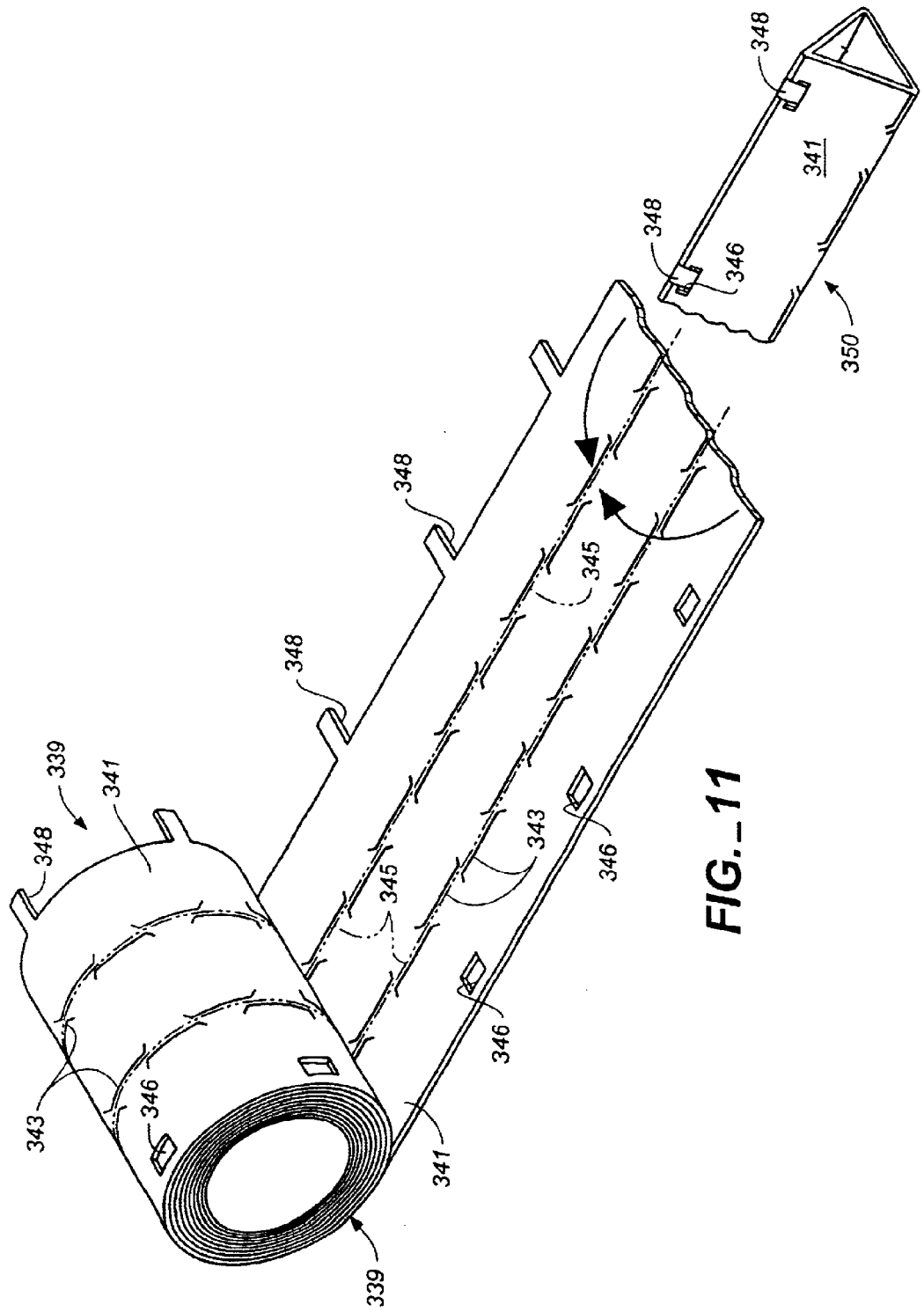
FIG._11

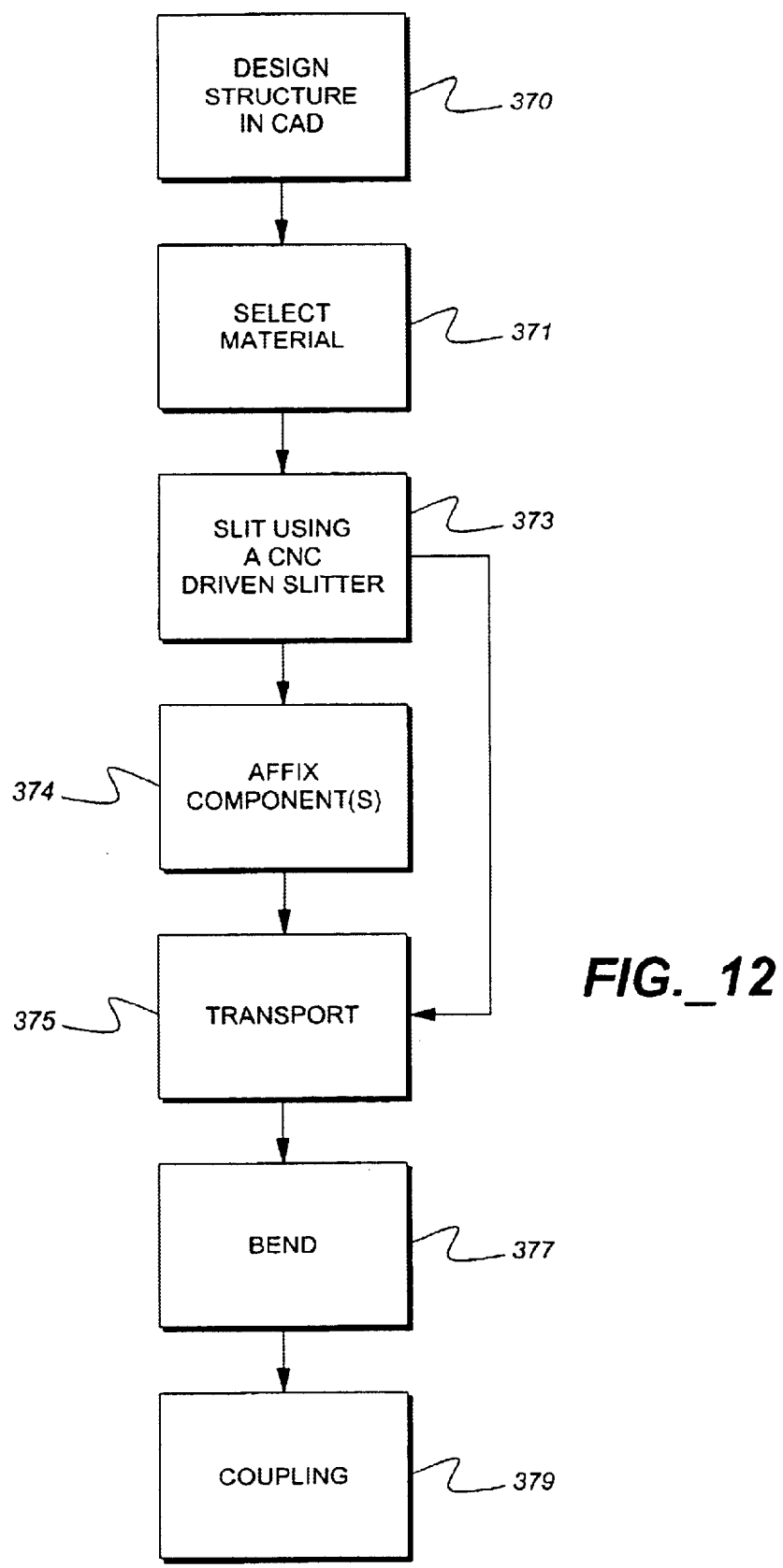
FIG._12

METHOD FOR PRECISION BENDING OF SHEET OF MATERIALS, SLIT SHEETS FABRICATION PROCESS

RELATED APPLICATION

This application is a Continuation-in-Part Application based upon a copending parent application, Ser. No. 09/640,267, filed Aug. 17, 2000, now U.S. Pat. No. 6,481,259 and entitled METHOD FOR PRECISION BENDING OF A SHEET OF MATERIAL AND SLIT SHEET THEREFOR.

TECHNICAL FIELD

The present invention relates, in general, to the bending of sheets of material and the formation of structures therefrom, and more particularly, relates to slitting sheet material in order to enable bending and to the use of such slit sheet material for rapid two-dimension to three-dimensional fabrication of high strength multi-component structures or assemblies.

BACKGROUND ART

A commonly encountered problem in connection with bending sheet material is that the locations of the bends are difficult to control because of bending tolerance variations and the accumulation of tolerance errors. For example, in the formation of the housings for electronic equipment, sheet metal is bent along a first bend line within certain tolerances. The second bend, however, often is positioned based upon the first bend and accordingly the tolerance errors can accumulate. Since there can be three or more bends which are involved to create the chassis or enclosure for the electronic components, the effect of cumulative tolerance errors in bending can be significant.

One approach to this problem has been to try to control the location of bends in sheet material through the use of slitting or grooving. Slits and grooves can be formed in sheet stock very precisely, for example, by the use of computer numerically controlled (CNC) devices which control a slit or groove forming apparatus, such as a laser, water jet, punch press, knife or tool.

Referring to FIG. 1, a sheet of material 21 is shown which has a plurality of slits or grooves 23 aligned in end-to-end, spaced apart relation along a proposed bend line 25. Between pairs of longitudinally adjacent slits or grooves are bending webs or straps 27 which will be plastically deformed upon bending of sheet 21. Webs 27 hold the sheet together as a single member. When grooves that do not penetrate through sheet 21 are employed, the sheet of material is also held together by the web of material behind each groove.

The location of grooves or slits 23 in sheet 21 can be precisely controlled so as to position the grooves or slits on bend line 25 within relatively close tolerances. Accordingly, when sheet 21 is bent after the grooving or slitting process, the bend occurs at a position that is very close to bend line 25. Since slits can be laid out on a flat sheet of material precisely, the cumulative error is much less in such a bending process as compared to one in which bends are formed by a press brake, with each subsequent bend being positioned by reference to the preceding bend.

Nevertheless, even a grooving-based or slitting-based bending of sheet material has its problems. First, the stresses in bending webs or straps 27, as a result of plastic deformation of the webs and slitting at both ends of webs 27, are substantial and concentrated. For grooving, the stresses on the material behind or on the back side of the groove also are substantial and very concentrated. Thus, failures at webs 27 and/or behind grooves 23 can occur. Moreover, the grooves or slits do not necessarily produce bending of webs 27 directly along bend line 25, and the grooving process is slow and inconsistent, particularly when milling or point cutting V-shaped grooves. Grooving, therefore, is not in widespread commercial use.

As can be seen in FIGS. 1A and 1B, if sheet 21 is slit, as is shown at 23a and/or grooved, as shown at 23b, and then bent, bending webs 27a and 27b will experience plastic deformation and residual stress: For slit 23a, of course, material will be completely removed or severed along the length of the slit. For V-shaped groove 23b, there will be a thin web 29 between groove 23b and the convex outside of the bend, but it also will be plastically deformed and highly stressed. The bend for V-shaped grooving will normally be in a direction closing groove 23b so that the side faces come together, as shown in FIG. 1B. Loading of the bent structure of FIGS. 1A and 1B with a vertical force $F_v$ and/or a horizontal force $F_H$ will place the bend, with the weakening slits and/or grooves and the plastically deformed straps or webs 27a, 27b, as well as thin web 29, under considerable stress. Failure of the structure will occur at lower force levels than if a non-slitting or non-grooving bending process were used.

Another scheme for sheet slitting to facilitate bending has been employed in the prior art. The slitting technique employed to produce bends, however, was designed primarily to produce visual or decorative effects for a sculptural application. The visual result has been described as "stitching," and the bends themselves need to be structurally reinforced by beams. This stitched sculpture was exhibited at the New York Museum of Modem Art in 1998 and was designed by two architects, Tehrani and Ponce de Leon. The sculpture is shown described in the publication entitled "Office dA" by Contemporary World Architects, pp. 15, 20–35, 2000. FIGS. 2, 2A and 2B of the present drawing show the stitching technique employed.

As shown in FIG. 2, a plurality of slits 31 are formed in a sheet material 32. Slits 31 are linear and offset laterally of each other along opposite sides of a bend line 33. The slits can be seen to longitudinally overlap so as to define what will become bending straps or "stitches" 34 between the overlapped slit ends. FIGS. 2A and 2B show an enlarged side elevation view of sheet 32, which has been bent along bend line 33 by 90 degrees, and sheet portions 35 and 36 one opposite sides of the bend line are interconnected by the twisted straps or "stitches" 34 which twist or stitch between the 90 degree sheet portions 35,36. The architects of this sculpture recognized that the resulting bend is not structurally strong, and they have incorporated partially hidden beams welded into the sculpture in the inner vertices of each of the stitched bends.

As sheet 32 is bent, straps 34 are plastically twisted over their length with the result that a back side of the strap engages face 38 on the other side of slit 31 at position 37. Such engagement lifts sheet portion 35 up away from face 38 on sheet portion 36, as well as trying to open end 40 of the slit and producing further stress at the slit end. The result of the lifting is a gap, G, over the length of slit 31 between sheet portion 35 and face 38. Twisted straps or stitches 34 force sheet portion 35 off of face 38 and stress both slit ends 40.

Such gaps G are produced at each slit 31 along the length of bend line 33 on alternative sides of the bend line. Thus, at each slit a sheet portion is forced away from contact with a slit-defining face instead of being pulled into contact with the face.

Moreover, and very importantly, the slitting configuration of FIG. 2 stresses each of straps 34 to a very high degree. As the strap length is increased (the length of overlap between the ends of slits 31) to attempt to reduce the stress from twisting along the strap length, the force trying to resiliently pull or clamp a sheet portion against an opposing face reduces. Conversely, as strap length 34 is decreased, twisting forms micro tears in the straps and stress risers and the general condition of the straps is that they are overstressed.

A vertical force (Fv in FIG. 2B) applied to sheet portion 35 will immediately load twisted and stressed strap 34, and because there is a gap G the strap will plastically deform further and can fail or tear before the sheet portion 35 is displaced down to engagement with and support on face 38. A horizontal force $F_H$ similarly will tend to crush the longitudinally adjacent strap 34 (and shear strap 34 in FIG. 2B) before gap G is closed and the sheet portion is supported on the opposing slit face.

Another problem inherent in the slitting scheme of FIGS. 2–2B is that the strap width cannot be varied independently of the distance between slits and the strap width cannot be less than the material thickness without stressing the straps to the extreme. When slits 31 are parallel to each other and overlapping, the strap width, by definition, must equal the spacing or jog between slits. This limits the flexibility in designs for structural loading of the straps.

The sheet slitting configuration of FIGS. 2–2B, therefore, can be employed for decorative bends, but it is not well suited for bends which are required to provide significant structural support.

A simple linear perforation technique also was used by the same architects in an installation of bent metal ceiling panels in a pizza restaurant in Boston. Again, the bent sheet components were not designed for, or capable of, bearing significant unsupported loads along the bends.

Slits, grooves, perforations, dimples and score lines have been used in various patented systems as a basis for bending sheet material. U.S. Pat. No. 5,225,799 to West et al., for example, uses a grooving-based technique to fold up a sheet of material to form a microwave wave guide or filter. In U.S. Pat. No. 4,628,161 to St. Louis, score lines and dimples are used to fold metal sheets. In U.S. Pat. No. 6,210,037 to Brandon, slots and perforations are used to bend plastics. The bending of corrugated cardboard using slits or die cuts is shown in U.S. Pat. No. 6,132,349 and PCT Publication WO 97/24221 to Yokoyama, and U.S. Pat. No. 3,756,499 to Grebel et al. and U.S. Pat. No. 3,258,380 to Fischer, et al. Bending of paperboard sheets also has been facilitated by slitting, as is shown in U.S. Pat. No. 5,692,672 to Hunt, U.S. Pat. No. 3,963,170 to Wood and U.S. Pat. No. 975,121 to Carter.

In most of these prior art bending systems, however, the bend forming technique greatly weakens the resulting structure, or precision bends are not capable of being formed, or bending occurs by crushing the material on one side of the bend. Moreover, when slitting is used in these prior art systems, in addition to structural weakening and the promotion of future points of structural failure, the slitting can make the process of sealing a bent structure expensive and difficult. These prior art methods, therefore, are less suitable for fabricating structures that are capable of containing a fluid or flowable material.

The problems of precision bending and retention of strength are much more substantial when bending metal sheets, and particularly sheets of substantial thickness. In many applications it is highly desirable to be able to bend metal sheets with low force, for example by hand, with only hand tools or with only moderately powered tools. Such bending of thick metal sheets, of course, poses greater problems In a second aspect of the present invention the ability to overcome prior art deficiencies in slitting-based bending of sheet material is applied to eliminate deficiencies in prior art metal fabrication techniques and the structures resulting therefrom.

A well known prior art technique for producing rigid three dimension structures is the process of cutting and joining together parts from sheet and non-sheet material. Jigging and welding, clamping and adhesive bonding, or machining and using fasteners to join together several discrete parts has previously been extensively used to fabricate rigid three dimensional structures. In the case of welding, for example, a problem arises in the accurate cutting and jigging of the individual pieces; the labor and machinery required to manipulate a large number of parts, as well as the quality control and certification of multiple parts. Additionally, welding has the inherent problem of dimensional shape warping caused by the heat affected zone of the weld.

Traditional welding of metals with significant material thickness is usually achieved by using parts having beveled edges often made by grinding or single point tools, which add significantly to the fabrication time and cost. Moreover, the fatigue failure of heat affected metals is inferior for joints whose load bearing geometries rely entirely on welded, brazed or soldered materials.

With respect to adhesively bonding sheet and non-sheet material along the edges and faces of discrete components, a problem arises from the handling and accurate positioning the several parts and holding or clamping them in place until the bonding method is complete.

Another class of prior art techniques related to the fabrication of three dimensional structures are the Rapid Prototyping methods. These include stereo lithography and a host of other processes in which a design is produced using a CAD system and the data representation of the structure is used to drive equipment in the addition or subtraction of material until the structure is complete. Prior art Rapid Prototyping techniques are usually either additive or subtractive.

The problems associated with subtractive Rapid Prototyping methods are that they are wasteful of materials and time in that a block of material capable of containing the entire part is used and then a relatively expensive high speed machining center is required to accurately mill and cut the part by removal of the unwanted material.

Problems also exist with prior art additive Rapid Prototyping techniques. Specifically, most such techniques are optimized for a very narrow range of materials. Additionally, most require a specialized fabrication device that dispenses material in correspondence with the data representing the part. The additive Rapid Prototyping processes are slow, very limited in the scale of the part envelope and usually do not make use of structurally robust materials.

In a broad aspect of the present invention relating to bending metal sheets, therefore, it is an important object of the present invention to be able to bend sheet material in a very precise manner and yet produce a bend which is capable of supporting substantial loading.

Another object of this aspect of the present invention is to provide a method for precision bending of sheets of material using improved slitting techniques which enhance the precision of the location of the bends and the strength of the resulting structures.

Another object of the present invention is to provide a precision sheet bending process and a sheet of material which has been slit for bending and which can be used to accommodate bending of sheets of various thicknesses and of various types of non-crushable materials.

Another object of the present invention is to provide a method for slitting sheets for subsequent bending that can be accomplished using only hand tools or power tools which facilitate bending but do not control the location of the bend.

Another object of the present invention is to be able to bend sheet material into high strength, three-dimensional structures having precise dimensioned tolerances.

It is another object of the present invention to be able to bend sheet materials into precise three dimensional structures that are easily and inexpensively sealed thus enabling the containment of fluid or flowable materials.

In a broad aspect of the present invention relating to the use of slit-based bending to enhance fabrication and assembly techniques, it is an object of the present invention to provide a new Rapid Prototyping and Advanced Rapid Manufacturing technique that employs a wide range of materials including many that are structurally robust, does not employ specialized equipment other than what would be found in any modern fabrication facility, and can be scaled up or down to the limits of the cutting process used.

It is another object of this aspect of the present invention to provide features within the sheet of material to be bent that assist in the accurate additive alignment of components prior to and after the sheet material is bent.

A further object of the present invention is to provide a fabrication method that serves as a near-net-shape structural scaffold for multiple components arranged in 3D space in the correct relationship to each other as defined by the original CAD design process.

It is a further object of the present invention to provide a method of fabricating welded structures that employs a smaller number of separate parts and whose edges are self jigging along the length of the bends and whose non-bent edges provide features that facilitate jigging and clamping in preparation for welding. In this context it is yet another object of the present invention to provide a superior method of jigging sheet materials for welding that dramatically reduces warping and dimensional inaccuracy caused by the welding process.

Yet another object of the present invention is to provide a novel welded joint that provides substantial load bearing properties that do not rely on the heat affected zone in all degrees of freedom and thereby improve both the loading strength and cyclical, fatigue strength of the resulting three dimensional structure.

Still another object of the present invention is to provide a superior method for:

1) reducing the number of discrete parts required to fabricate a strong, rigid, dimensionally accurate three dimensional structure or assembly, and 2) inherently providing a positioning and clamping method for the various sides of the desired three dimensional structure that can be accomplished through the bent and unbent edges of the present invention resulting in a lower cost, higher yield fabrication method.

It is a further object of the present invention to provide a method of fabricating a wide variety of fluid containing casting molds for metals, polymers, ceramics and composites in which the mold is formed from a slit, bent, sheet of material which can be either removed after the solidification process or left in place as a structural or surface component of the finished object.

Still another object of the present invention is to provide a sheet bending method that is adaptable for use with existing slitting devices, enables sheet stock to be shipped in a flat or coiled condition and precision bent at a remote location without the use of a press brake, and enhances the assembly or mounting of components within and on the surfaces in the interior of enclosures formed by bending of the sheet stock after component affixation to the sheet stock.

The method for precision bending of sheet material, the fabrication techniques therefore and the structures formed from such precision bending of the present invention have other features and objects of advantage which will become apparent from, or are set forth in more detail in, the accompanying drawing and the following description of the Best Mode of Carrying Out The Invention.

DISCLOSURE OF INVENTION

The apparatus of the present invention is comprised, briefly, of a sheet of material having a plurality of slits formed therethrough positioned relative to a proposed bend line and configured to allow bending of bending straps, which are preferably obliquely oriented to the bend line, with a resulting edge-to-face engagement of material on opposite sides of the slits for increased bend strength, bend integrity, and dimensional accuracy.

The method for precision bending of a sheet of material of the present invention is comprised, briefly, of the steps of forming a plurality of longitudinally extending slits through the sheet in axially spaced relation in a direction extending along, and proximate to, a bend line to define bending straps or webs between adjacent ends of pairs of the slits, the slits are further configured and positioned during the forming step to produce edge-to-face engagement of the sheet material on opposite sides of the slits upon bending of the-sheet of material; and the step of bending the sheet of material along the bend line to produce such edge-to-face engagement of the material on opposite sides of the slits.

In one embodiment, the slitting step is accomplished by forming two elongated slits longitudinally shifted along the bend line, with each slit having a slit end portion which diverges away from the bend line to provide a pair of adjacent slit portions on opposite sides of the bend line which define an oblique bending strap extending across the bend line. The slit kerf is dimensioned and positioned to produce interengagement of an edge of the sheet of material on one side of the slits with a face of the sheet of material on the opposite side of the slits during bending. Most preferably the slits are arcuate and produce continuous and progressive engagement of an edge with an opposing face, with the result that the edge is resiliently clamped and held against the opposing face over a substantial portion of the length of the slit.

In another embodiment of the method of the present invention, the step of slitting is accomplished by forming a first elongated slit through the sheet of material along the bend line which slit is composed of a pair of proximate, transversely spaced apart, parallel and longitudinally extending, first slit segments connected near a common transverse plane by a transversely extending slit segment; and by forming a second elongated slit in substantially longitudinally aligned and longitudinally spaced relation to the first elongated slit. The step of forming the second elongated slit also preferably is accomplished by forming a pair of proximate, transversely spaced apart, parallel and longitudinally extending, slit segments connected near a common transverse plane by a transversely extending slit segment. Thus, instead of one continuous elongated slit, each slit in the pair of slits is formed as a slightly stepped slit proximate a midpoint of the combined length of the slit segments.

In both embodiments, a virtual fulcrum is provided upon bending that can be positioned precisely on the bend line to cause bending of the bending straps or webs more precisely along the bend line. The detailed concept of the virtual fulcrum is described in below in the BEST MODE OF CARRYING OUT THE INVENTION. In the most preferred form, the slits may be provided with enlarged end openings so as to reduce stress concentrations proximate the bending webs, or with curved end that cause any cracks that might propagate to be directed back into the slit.

BRIEF DESCRIPTION OF THE DRAWING

FIG. 1 is a fragmentary, top plan view of a sheet of material having slits and grooves formed therein in accordance with one prior art technique.

FIG. 1A is an enlarged, fragmentary view, in cross section, taken substantially along the plane of line 1A—1A in FIG. 1, of the sheet of FIG. 1 when in a bent condition.

FIG. 1B is an enlarged, fragmentary view, in cross section, taken substantially along the plane of line 1B—1B of FIG. 1, of the sheet of FIG. 1 when in a bent condition.

FIG. 2 is a fragmentary, top plan view of a sheet of material having a plurality of slits formed therein using an alternative configuration known in the prior art.

FIG. 2A is an enlarged fragmentary side elevation view of the sheet of FIG. 2 bend by about 90 degrees.

FIG. 2B is a cross sectional view taken substantially along the plane of line 2B—2B in FIG. 2A.

FIG. 3 is a fragmentary, top plan view of a sheet of material slit in accordance with one embodiment of the present invention.

FIGS. 4A–4D are fragmentary, top plan views of a sheet of material which has been slit according to the embodiment of FIG. 3 and which is in the process of being bent from a flat plane in FIG. 4A to a 90 degrees bend in FIG. 4D.

FIGS. 5A—5A''', 5B—5B'''and 5C—5C''' are fragmentary, cross sectional views, taken substantially along the planes of lines 5A—5A''', 5B—5B''' and 5C—5C''' respectively, in FIGS. 4A–4D during bending of the sheet of material.

FIG. 6 is a top plan view of a sheet of material slit in accordance with a second embodiment of the present invention.

FIG. 7 is a top plan view of the sheet of FIG. 6 after being bent by about 90 degrees.

FIG. 8 is an end view of the sheet of material of FIG. 7.

FIG. 8A is an enlarged, end elevation view, in cross section, of the sheet of material of FIG. 7 taken substantially along the plane of 8A—8A in FIG. 7 and rotated by about 45 degrees from FIG. 8.

FIG. 8B is an enlarged, end elevation view, in cross section, of the sheet of material of FIG. 7 taken substantially along the plane of 8B—8B in FIG. 7 and rotated by about 45 degrees from FIG. 8.

FIG. 9 is a fragmentary top plan view of a sheet of material slit according to a further alternative embodiment of the present invention.

FIG. 10 is a side elevation view of the sheet of FIG. 9 after bending by about 90 degrees.

FIG. 10A is a fragmentary cross sectional view taken substantially along the plane of line 10A—10A in FIG. 10.

FIG. 11 is a top perspective view of a coiled sheet of material which has been slit in accordance with the present invention and is in the process of being rolled out and bent into a three-dimensional structure.

FIG. 12 is a schematic flow diagram of one aspect of the bending material of the present invention.

BEST MODE OF CARRYING OUT THE INVENTION

The present method and apparatus for precision bending of sheet material is based upon the slitting geometries disclosed in my prior application, Ser. No. 09/640,267, filed Aug. 17, 2000, and entitled METHOD FOR PRECISION BENDING OF A SHEET OF MATERIAL AND SLIT SHEET THEREFOR, which is incorporated herein by reference in its entirety. In one aspect of the invention set forth in my prior application, stress reduction at the ends of the slits was addressed. That aspect will not be repeated herein. In the other aspect of my prior application, slitting so as to enable bending about a virtual fulcrum producing precision, high strength bends will be set forth in more detail herein.

One embodiment of the precision and high strength bending process and apparatus of the present invention can be described by reference to FIGS. 3–5. In FIG. 3 a sheet of material 41 is formed with a plurality of slits, generally designated 43, along a bend line 45. Slits 43, therefore, are longitudinally extending and in end-to-end spaced relation so as to define bending webs or straps 47 between pairs of slits 43. In FIG. 3, slits 43 are provided with stress reducing structures at ends thereof, namely openings 49, so as to effect a reduction in the stress concentration in bending webs 47. It will be understood from the description below, however, that stress reducing structures, such as enlarged openings 49 in FIG. 3, are not required for realization of the benefits of the precision bending system of the present invention.

For the embodiment of slits 43 shown in of FIG. 3, however, each longitudinally extending slit between the slit ends is laterally or transversely stepped relative to bend lines 45. Thus, a slit, such as slit 43a, is formed with a pair of longitudinally extending slit segments 51 and 52 which are positioned proximate to, and preferably equidistant on opposite sides of, and substantially parallel to, bend line 45. Longitudinal slit segments 51 and 52 are further connected by a transversely extending slit segment 53 so that slit 43a extends from enlarged opening 49a to enlarged 49b along an interconnected path which opens to both of the enlarged openings and includes both longitudinally extending slit segments 51, 52 and transverse slit segment 53.

The function and advantages of such stepped slits can best be understood by reference to FIGS. 4A–4D, and the corresponding FIGS. 5A–5C to 5A'''–5C''', wherein the bending of a sheet of material 41, such as shown in FIG. 3 is illustrated at various stages. In FIG. 4A, sheet 41 is essentially slit as shown in FIG. 3. There is a difference between FIGS. 3 and 4A in that in FIG. 3 a kerf width or section of removed material is shown, while in FIG. 4A the slit is shown without any kerf, as would be produced by a slitting knife or punch. The effect during bending, however, is essentially the same if the kerf width is small enough that the material on the opposite sides of the slit inter-engages during bending. The same reference numerals will be employed in FIGS. 4A–5C''' as were employed in FIG. 3.

Thus, sheet 41 is shown in a flat condition before bending in FIG. 4A. Longitudinally extending slit segments 51 and 52 are shown in FIG. 4A and in the cross sections of FIGS. 5A–5C. The positions of the various cross sections of the sheet are also shown in FIG. 4A.

In FIG. 4B, the sheet has been bent slightly along bend line 45, which can best be seen in FIGS. 5A'–5C'. As can be seen in FIGS. 5A' and 5B', slits 51 and 52 have opened up along their top edges and the portion of the sheet which extends beyond bend line 45 is referred to herein as "tab" 55. The lower or bottom side edges 51a and 52a of tabs 55 have moved up slightly along supporting faces 51b and 52b of the sheet on the opposite sides of the slit opposite to tabs 55. This displacement of tab edges 51a and 52a may be better seen in connection with the sheet when it is bent to a greater degree, for example, when bent to the position shown in FIG. 4C.

In FIG. 4C it will be seen that tab edges 51a and 52a have moved upwardly on supporting faces 51b and 52b of sheet 41 on opposite sides of bend line 45.

Thus, there is sliding contact between edges 51a and 52a and the opposing supporting faces 51b and 52b of the slit during bending. This sliding contact will be occurring at locations which are equidistant on opposite sides of central bend line 45 if longitudinal slit segments 51 and 52 are formed in equally spaced positions on opposite sides of bend line 45, as shown in FIG. 4A. Sliding contact also can be facilitated by a lubricant or by adhesives or sealants prior to their setting up or bonding.

The result of this structure is that there are two actual bending fulcrums 51a, 51b and 52a, 52b spaced at equal distances from, and on opposite sides of, bend line 45. Tab edge 51a and supporting face 51b, as well as tab edge 52a and supporting face 52b, produce bending of bending web 47 about a virtual fulcrum that lies between the actual fulcrums and will be understood to be superimposed over bend line 45.

The final result of a 90 degree bend is shown if FIG. 4D and corresponding cross sections 5A'''–5C'''. As will be seen, sheet edge 52a and bottom side or surface 52c now are interengaged or rest on, and are supported in partially overlapped relation to, supporting face 52b (FIG. 5A'''). Similarly, edge 51a and bottom surface 51c now engages and rests on face 51b in an overlapped condition (FIG. 5B'''). Bending web 47 will be seen to have been plastically deformed or extended along an upper surface of the web 47a and plastically compressed along a lower surface 47b of web 47, as best illustrated in FIG. 5C'''.

In the bent condition of FIG. 4D, the tab portions of the sheet, namely, portions 55, which extend over the center line when the sheet is slit, are now resting on supporting faces 51b and 52b. This edge-to-face engagement and support, which alternates in the configuration shown in the drawing, gives the bent structure greater resistance to shear forces at the bend in mutually perpendicular directions. Thus a load $L_a$ (FIG. 5A''') will be supported between bending webs 47 by the overlap of the edge 52a and bottom surface 52c on supporting edge 52b. Similarly, a load $L_b$ will be supported by overlap and engagement of the edge 51a and surface 51c on supporting face 51b intermediate bending webs 47.

This is referred to herein as "edge-to-face" engagement and support of the material along substantially the entire length of one side of the slit by the material along substantially the entire length of the other side of the slit. It will be appreciated that, if sheet 41 were bent by more than 90°, edges 51a and 52a would lift up off the faces 51b and 52b and the underneath surfaces 51c and 52c would be supported by the lower edges of face 51b and 52b. If the sheet is bent by less than 90 degrees the edge still comes into engagement with the face almost immediately after the start of bending, but only the edge engages the face. This support of one side of the slit on the other shall be deemed to be "edge-to-face" engagement and support as used in the specification and the claims.

While webs 47 have residual stresses as a result of plastic deformation, and while the slits cause a substantial portion of the bend not to be directly coupled together in the slit-based bending system of the present invention, the slits are formed and positioned so as to produce an edge-to-face overlap which provided substantial additional strength to the bent structure over the strength of the structures of FIGS. 1A and 1B which are based upon conventional slitting or grooving geometries. The bending straps, in effect, pre-load the bend so as to pull or clamp the sides of the slit into edge-to-face engagement over substantially the entire slit length. Pre-loading of the bend by the residual tension in the strap also tends to prevent vibration between the slit edge which is pre-loaded against the face which acts as a bed on the other side of the slit.

Moreover, since the edges are interengaged with the faces over a substantial portion of the length of the slits, loads $L_a$ and $L_b$ will not crush or further plastically deform bending straps 47, as is the case for the prior art slitting configuration of FIGS. 2, 2A, 2B. Loading of the present bend is immediately supported by the edge-to-face engagement produced by the slitting technique of the present invention, rather than by the cross sectional connecting area of a twisted and highly stressed strap, as results in the prior art configuration of FIGS. 2, 2A, 2B.

The embodiment employing laterally stepped or staggered slits of the present invention, therefore, result in substantial advantages. First, the lateral position of the longitudinally extending slit segments 51 and 52 can be precisely located on each side of bend line 45, with the result that the bend will occur about a virtual fulcrum as a consequence of two actual fulcrums equidistant from, and on opposite sides of, the bend line. This precision bending reduces or eliminates accumulated tolerance errors since slit positions can be very precisely controlled by a cutting device that which is driven by a CNC controller. One additional advantage of using a water jet or laser slitting devices is that the material on each side of the slit will not have been significantly laterally shifted or compressed during slitting.

It also should be noted, that press brakes normally bend by indexing off an edge of a sheet, or an existing bend, or other feature(s). This makes bending at an angle to the sheet edge feature(s) difficult using a press brake. Bending precisely at angles to any feature(s) the sheet edge, however, can be accomplished readily using the present slitting process. Additionally, the resulting bent sheet has substantially improved strength against shear loading and loading along mutually perpendicular axes because the overlapped edges and faces produced by the present slit configurations support the sheet against such loads.

As can be seen, the embodiment of the present invention, as shown in FIGS. 3–5C''' produces precision bending of straps 47 which are substantially perpendicular to the bend line. Such an orientation of the bending straps produces significant plastic elongation along the outside or top surface of the strap, as well as significant compression along the inside or bottom surface of the strap. The bend occurs on the relatively short perpendicular straps in a manner similar to the bends of the perpendicular straps of FIGS. 1–1B, but in FIGS. 3–5C''' the tab of one plane is tucked into interlocking or interengaged relationship with the face of the other plane for increased bend strength.

The prior art approach shown in FIGS. 2–2B orients the connecting straps 34 parallel to the bend line and results in significant plastic twisting deformation of the straps. Moreover the straps do not fully tuck or clamp the opposite sides of the sheet into interengaged relation over the length of the slits. Still further in the embodiment of FIGS. 3–5C''' the strap width can be varied independently of the jog distance between slits 51 and 52 so that greater flexibility in design of the bend strength can be achieved.

While bending of sheet material by 90 degrees has been illustrated in the drawing, it will be understood that most of the advantages described in all embodiments of the present invention also can be realized if the slit sheet is bent by more or less than 90 degrees. The tab which extends across the bend line will slide onto and engage the opposite face beginning at small bend angles, and such support and engagement will continue at large, 90 degree plus, bend angles.

It has been found that the embodiment of FIGS. 3–5C''' is best suited for use with relatively ductile sheet materials. As the material becomes harder and less ductile, the second embodiment of FIGS. 6 to 11 is preferred In the embodiment of the present invention shown in FIGS. 6–8B a slitting configuration is employed which tucks or clamps the sheet material into interengaged relation on both sides of the slits, and also reduces bending strap plastic deformation and the residual stress in the straps. Moreover, this embodiment also allows the strap width to be varied independently of the jog distance.

A bending strap which is oblique to the bend line is employed, which allows the strap length to be increased, as compared to the shorter bending straps of FIGS. 3–5C'''. Plastic deformation also is accomplished in part by twisting, rather than purely by bending, as in FIGS. 3–5C''', but the amount of twisting is greatly reduced, as compared to the parallel straps of FIGS. 2–2B. Moreover, the material tabs on opposite sides of the slit are tucked into interengagement with the faces over virtually the entire length of the slit so that substantial additional strap stress on loading does not occur.

Additionally, in the embodiment shown in FIGS. 6–8B, the slit configuration produces a continuous sliding interengagement between material on opposite sides of the slits during bending, which interengagement progresses along the slit from the ends toward the middle. The faces on one side of the slits act as beds for sliding support during the bend, which results in a more uniform and a less stressful bending of the bending straps. The embodiment as shown in FIGS. 6–8B, therefore, can be used with sheet material that is less ductile, such as heat treated 6061 Aluminum or even some ceramics, and with thicker sheets.

Referring specifically to FIGS. 6–8B, a sheet of material 241 to be bent is formed with a plurality of longitudinally extending slits 243 along a bend line 245. Each of slits 243 optionally may be provided with enlarged stress-relieving end openings 249, or a curved end section 249a, which will cause any stress cracks to propagate back into slits 243. As will be seen, the slits of the embodiment of FIGS. 6 and 8B are not stepped, but they are configured in a manner producing bending of obliquely oriented bending straps 247 about a virtual fulcrum superimposed on bend line 245. The configuration and positioning of the slits also causes the sheet material on opposite sides of the slits to tuck or move into an edge-to-face interengaged relationship.

While the embodiments shown and described in FIGS. 6–8B and 9–10A are not stepped, the oblique straps of the embodiments of 6–8B and 9–10A can be combined with the stepped slit configuration of FIGS. 3–5C'''. Thus, one or both of the ends of the stepped slits can be oblique or curved.

As shown in FIG. 6, pairs of elongated slits 243 are preferably positioned on opposite sides of and proximate to bend line 245 so that pairs of longitudinally adjacent slit end portions 251 on opposite sides of the bend line define a bending strap 247, which can be seen to extend obliquely across bend line 245. Thus, each slit end portion 251 diverges away from bend line 245. Although not an absolute requirement to effect bending in accordance with the present invention, it will be seen that slits 243 are longitudinally overlapping along bend line 245. Unlike slits 31 in FIGS. 2–2B, which are parallel to the bend line in the area defining bending straps 34, the divergence of the slits 243 from bend line 245 results in oblique bending straps that do not require the extreme twisting present in the prior art of FIGS. 2–2B.

As was the case for the first embodiment, the slit kerfs preferably have a width dimension producing interengagement of sheet material on opposite sides of the slits during bending. Thus, slits 243 can be made with a knife and have essentially a zero kerf, or they can have a greater kerf which still produces interengagement, depending upon the thickness of the sheet being bent. As was the case for the embodiment of FIGS. 3–5C''', a tab portion 253 extends across bend line 245 to slit 243. Tab 253 slides or rides up a face 255 of sheet material defined by the opposite side of slits 243 if the kerf width, relative to the thickness of the material, is not so large as to prevent contact between the two SIDES OF THE SLIT during bending. It is possible to have the kerf width and position such that contact between the tab portion 253 and the face 255 does not occur and still have some of the advantages of oblique bending straps, but in such instances there are no actual fulcrums for bending so that bending along bend line 245 becomes less predictable and precise.

Another problem which will be associated with a kerf width that is too wide to produce interengagement of tabs 253 with faces 255 is that the resultant bent sheet material will not have a tab edge supported on a slit face, unless the bend is relatively extreme so as to define a small arcuate angle between the two sides of the bent sheet. As noted in connection with the prior art slitting approach, this will result in immediate further stressing of the bending straps upon loading. The problem would not be as severe in the strap configuration of FIGS. 6–8B as in the prior art, but the preferred form is for the kerf width to be selected to insure interengagement throughout the bending process.

If the kerf width is such that interengagement occurs, it will be seen that slits 243 can be positioned equidistant on opposite sides of bend line 245 so that faces 255 of alternate slits provide actual fulcrums for bending and cause the virtual fulcrum to be superimposed over bend line 245.

It is also possible for the slits 243 to actually be on the bend line or even across the bend line and still produce precise bending from the balanced positioning of the actual fulcrum faces 255 and the edges of tabs 253 sliding therealong. A potential disadvantage of the slits 243 being formed to cross the bend line 245 is that an air-gap would remain between edge 257 and face 255. An air-gap, however, may be acceptable in order to facilitate subsequent welding, brazing, soldering, adhesive filling or if an air-gap is desired for venting. Slit positioning to create an air-gap is a desirable feature of the present invention when subsequent bend reinforcement is employed. Unfilled, however, an air-gap will tend to place all of the load bearing requirements of the bend in all degrees of freedom, except rotation, on the connected zone or cross sectional area of plastically deformed strap 247.

FIGS. 7, 8, 8A and 8B illustrate the sheet 241 as bent to a 90° angle along bend line 245. As best may be seen in FIGS. 8A and 8B, an inside edge 257 of tab 253 has slid up on face 255 of the opposite side of the slit and is interengaged and supported thereon. A vertical force, $F_v$, therefore, as shown in FIG. 8A is supported by the overlap of edge 257 on face 255. A horizontal force, $F_H$, as shown in FIG. 8B similarly will be resisted by the overlap of edge 257 on face 255. Comparison of FIGS. 8A and 8B to the prior art FIGS. 1A, 1B and 2A and 2B will make apparent the differences which the present bending method and slit configuration have on the strength of the overall structure. The combination of alternating overlapping edge-to-face support along the slits and the oblique bending straps, which are oblique in oppositely skewed directions, provides a bend and twist which is not only precise but has much less residual stress and higher strength than prior slitting configurations will produce. Obviously, skewing of the bending straps in opposite directions is not required to achieve many of the advantages of the present invention.

The geometry of the oblique slits is such that they bend and twist over a region that tends to reduce residual stress in the material at the point where the slit is terminated. Thus, crack propagation is reduced, lessening the need for enlarged openings or curls at the slit ends.

Moreover, it will be understood that slits 243 can be shifted along bend line 243 to change the width of straps 247 without increasing jog distance at which the slits are laterally spaced from each other. Conversely, the jog distance between slits 243 can be increased and the slits longitudinally shifted to maintain the same strap thickness. Obviously both changes can be made to design the strap width and length to meet the application.

Generally, the ratio of the transverse distance from slit to slit, or twice the distance to the bend line is referred to as the "jog". The ratio on-the-job distance relative to the material thickness is in the preferred embodiments of the present invention will be less than 1. That is, the jog distance usually is less than one material thickness. A more preferred embodiment makes use of a jog distance ratio of less than 0.5 material thickness. A still more preferred embodiment makes use of a jog distance ratio of approximately 0.3 material thickness, depending upon the characteristics of the specific material used and the widths of the straps.

The width of bending straps 247 will influence the amount of force required to bend the sheet and that can be varied by either moving slits 243 farther away from the bend line 245 or by longitudinally shifting the position of the slits, or both. Generally, the width of oblique bending straps 247 most preferably will be selected to be greater than the thickness of the material being bent, but strap widths in the range of about 0.5 to about 4 times the thickness of the material may be used. More preferably, the strap width is between 0.7 and 2.5 times the material thickness.

One of the advantages of the present invention, however, is that the slitting configuration is such that bending of sheets can normally be accomplished using hand tools or tools which are relatively low powered. Thus, the bending tools need only so much force as to effect bending and twisting of bending straps 247; they do not have to have sufficient power so as to control the location of the bend. Such control is required for powered machines, such as press brakes, which clamp the material to be bent with. sufficient force so as to control the location of the bend. In the present invention, however, the location of the bend is controlled by the actual fulcrums, namely edge 257 pivoting on face 255 on opposite sides of the bend line. Therefore, the tool required need only be one which can effect bending of straps 247, not positioning of the bend. This is extremely important in applications in which high strength power tools are not readily available, for example, in outer space fabrication of structures or at fabricators who do not have such high-powered equipment. Additionally, such low bending forc, trong, accurate bends are important in the fabrication of structures in which physical access to power bending equipment is not possible because of the geometry of the structure itself. This is particularly true of the last few bends required to close and latch a 3D structure.

The most preferred configuration for slit end portions 251 is an arcuate divergence from bend line 245. In fact, it has been found to be particularly advantageous to form each slit as a continuous arc, as shown in FIGS. 9, 10 and 10A and described below. An arc causes the material on the tab side of the slit to smoothly and progressively move up the face side of the slit along an arcuate path beginning at slit center and progressing to the ends of the slit. This reduces the danger of hanging up of edge 257 on face 255 during bending and thereby is less stressful on the bending straps. In the configuration of FIGS. 6–8B, the central portion of slits 243 is substantially parallel to bend line 245. Some non-parallel orientations, particularly if balanced on either side of the bend line, may be acceptable and produce the results described herein.

It also would be possible to form end portions 251 to diverge from bend line 245 at right angles to the bend line and the center of slits 243. This would define a bending strap that could be non-oblique, if the slits did not longitudinally overlap. The disadvantage of this approach is that the bending straps 247 tend not to bend as uniformly and reliably and thereby influence the precision of the location of the bend. Additionally, such a geometry eliminates twisting of the strap and induces severe points of stress concentration on the inner and outer radii of the bend and may limit the degree of edge-to-edge engagement.

The bending straps in all the embodiments of the present invention are first elastically deformed and in most materials thereafter plastically deformed. (The present slitting invention also can be used with elastically deformable plastics that never plastically deform. Such materials would be secured in a bent condition so that they do not resiliently unbend.) At the end of the bend of a plastically deformed sheet, however, there will remain a certain resilient elastic deformation tending to pull edge 257 down against face 255 and resulting in residual resilient clamping force maintaining the interengagement between material on opposite sides of the slits. Thus, the elastic resiliency of the sheet being bent will tend to pre-load or snug down the overlapping sheet edges against the supporting faces to ensure strength at the bend and reduce bending strap incremental stress on loading of the bend.

The embodiment shown in FIGS. 9, 10 and 10 is a special case of the oblique strap embodiment described in connection with FIGS. 6–8B. Here the oblique straps are formed by completely arcuate slits 443. This slit configuration, preferably a circular segment, is particularly well suited for bending thicker and less ductile metal sheets, for example, ceramics and ¼ inch steel plate and up.

When arcuate or circular slits 443 are formed in sheet 441 on opposite sides of bend line 435, the tab portions 453 of the sheet, which extend over bend line 445 to slits 443, begin tucking or sliding onto face 455 at a center 460 of each arcuate slit at the start of bending. The tab portion 453 then slides from the center of each slit partially up onto faces 455 progressively toward the slit ends as straps 447 are twisted and bent. The progressive tucking of the tabs onto the opposing faces is less stressful on the slit ends 449, and therefore more suitable for bending of less ductile and thicker materials, than say the embodiment of FIGS. 6–8B, in which the slits have straight central portions and simultaneously slide up onto the faces over the entire straight portion.

The various embodiments of the present sheet slitting invention allow manufacturing and fabrication advantages to be achieved which have not heretofore been realized. Thus, the full benefits of such design and fabrication techniques as CAD design, Rapid Prototyping and "pick and place" assembly can be realized by using sheet stock slit in accordance with the present invention. Moreover, standard fabrication techniques, such as welding, are greatly enhanced using the slitting configurations of the present invention.

The many advantages of using sheets slit in accordance with the present invention can be illustrated in connection with a manufacturing technique as basic as welding. Sheet bending using the present slitting method, for example, avoids the manufacturing problems associated with handling multiple parts, such as jigging.

Additionally, the bent sheets of the present invention can be welded along the slits. As can be seen in FIG. 10A, for example, face 455 and end surface 457 of tab 453 form a V-shaped cross section that is ideal for welding. No grinding or machining is required to place a weld 460 (broken lines) along slits 443 as shown in FIG. 10A. Moreover, the edge-to-face engagement of the sides of the sheet on opposite side of the slits, in effect, provides a jig or fixture for holding the sheet portions together during the weld and for reducing thermally induced warping. Set up time is thereby greatly reduced, and the dimensional accuracy achieved by the present slitting process is maintained during the welding step. The arcuate slits also provide an easily sensed topographic feature for robotic welding. These advantages also accrue in connection with soldering, brazing and adhesive filling, although thermal distortion is usually not a serious issue for many adhesives.

Filling of the slits by welding, brazing, soldering or adhesives allows the bent sheets of the present invention to be formed into enclosures which hold fluids or flowable materials. Thus, bend sheet enclosures can even be used to form fluid-tight molds, with the sheeting either being removed or left in place after molding.

One of the significant advantages of using oblique, and particularly curved, slits is that the resulting bending straps are diverging at the point at which they connect to the remainder of the sheet material. Thus, area 450 of strap 447 in FIG. 10 is transversely diverging between slit end 449 and the next slit 443. This divergence tends to deliver or transfer the stresses in strap 447 at each end into the remainder of the sheet in a diffused or unconcentrated manner. As the arc or radius of the slits is reduced the divergence increases, again allowing a further independent tailoring of the strap stress transfer across the bend. Such tailoring can be combined with one or more of changes to strap width, jog distance and slit kerf to further influence the strength of the bend.

Another advantage which accrues from the various embodiments of the slitting system of the present invention is that the resulting bends are relatively sharp, both internally and externally. Sharp bends enable strong coupling of a bent structure to another structure. Thus, a press brake bend tends to be arcuate or have a small radius at the bend. When such a press brake bent structure is coupled to a plate, for example, and a force applied tending to rotate the bent structure about the arcuate bend, the bent structure can decouple from the plate. Such decoupling can occur more easily than if the bend were sharp, as is the case for the bend resulting from the present slitting scheme.

Perhaps one of the most interesting fabrication potentials realized by using the present slitting configurations is in connection with Rapid Prototyping and Rapid Manufacturing, particularly if automated Pick and Place component additions are employed. Rapid Prototyping is broadly known and is comprised of the use of CAD design to enable three-dimensional fabrication. The designer begins with a desired virtual three-dimensional structure. Using the current invention to enable Rapid Prototyping, the CAD software unfolds the three-dimensional structure to a two-dimensional sheet and then locates the slit positions for bending of the sheet to produce the desired structure. The ability to precisely bend, and to tailor the bend strength, by selecting jog distances and bending strap widths, allows the designer to layout slits in the unfolded two-dimensional sheet drawing, which thereafter can be implemented by sheet slitting and bending to produce complex three-dimensional structures, with or without add-on components.

Broadly, it is also known to assembley components onto circuit boards for electronic devices using high speed "pick and place" automated component handling techniques. Thus, assembly robots can pick components from component supply devices and then place them on a circuit board or substrate or chassis. The robotics secure the components to the substrate using fasteners, soldering plug-ins or the like. Such "pick and place" assembly has been largely limited to placing the components on a flat surface. Thus, the circuit boards must be place in three-dimensional housing after the "pick and place" assembly has been completed.

An electronic housing, usually cannot be folded or bent into a three-dimensional shape after components are secured to the walls of the housing. Moreover, prior techniques for bending have lacked the precision possible with the present invention and necessary to solve component or structural alignment problems. Pre-folding or bending up the housing has, therefore, limited the ability for pick and place robotics to be used to secure electronic components in the housings.

It also should be noted that the straps present between slits can be advantageously used as conductive paths across bends in electronic applications, and the precessionprecision possible allows conductive paths or components on the circuit board to be folded into alignment when the three-dimensional chassis is formed, or when circuit boards themselves are folded into a more dense conformation The slitting process of the present invention, however, enables precision bends to be formed with relatively low forces being involved. Thus. a slit housing can be flat and high-speed pick and place robotics used to rapidly secure components to any or all six walls of a cube enclosure, and the housing or component chassis can be easily bent into a three-dimensional shape after the pick and place process is completed. Moreover, the bending need not take place at the pick and place or rapid prototyping site. The sheet with attached components can be transported with the components being formed and selected to act as dunnage for the transport process. Once at the fabrication site, the chassis or housing sheet will be bent precisely, even by hand if desired, and the bent housing secured into a three-dimensional structure, with a plurality of selected components being secured thereto, internally and/or externally.

In FIGS. 11 and 12 illustrate a method which can be used to form three-dimensional structures, particularly at locations remote of the location at which the structure is slit and/or partially assembled prior to bending. One application which is of particular interest is the fabrication of three-dimensional structures in outer space. Currently such structures are assembled in outer space from three-dimensional modules; they generally are not actually fabricated in outer space. The problem with space assembly is that the modules require an undesirable amount of volume in the payload of orbital space vehicles. Heretofore, one problem with fabrication in outer space has been that the tools required to form high-strength, three-dimensional structures have been prohibitively large and bulky. Another problem with assembly in space can be associated with a high part count and high fastener count. On the one hand, bulky near complete modules have been launched and fastened together. On the other hand, heretofore, dense packing of unassembled modules has resulted in a high part count and high fastener count.

In FIG. 11, a coil 339 of sheet material 341 is shown which has been slit on two bend lines 345. This sheet is also formed with openings 346 and tabs 348 periodically positioned proximate opposed sheet edges. As will be seen, slits 343 may advantageously take the configuration as shown in FIG. 6. As will be appreciated, the coil 339 is a highly compact configuration for the transport of sheet material. Sheet 241 can be formed with slits 243, openings 246 and tabs 248, as well as other desired structural features, at an earth-bound shop having unlimited fabrication equipment. The sheet is then rolled into coil 339 and transported by a space vehicle to an outer space location. The sheet 341 can then be unrolled from coil 339, and either, while being unrolled, or thereafter, the sheet can be fabricated, using hand tools or moderately powered tools, into a three-dimensional structure. Such fabrication is accomplished by bending the sheet along bend lines 345 and by bending tabs 348 into openings 346 so as to lock the sheet in a three-dimensional structure 350, as shown at the right-hand side of FIG. 11.

As shown in FIG. 11, structure 350 is an elongated beam with a triangular cross section which can, in turn, be coupled to other structures to produce complex three-dimensional space structures and habitats. When the sheet bending slit configuration of the present invention is employed, each of the bends produced at the pattern of slits 343 will include the edge-to-face support of the sheet material which will make the bends capable of withstanding substantial loading. Obviously, other beam and structural configurations can be produced by folding along bend lines having slits of the type described above.

Moreover, using the slitting method and apparatus of the present invention ensures the precise positioning of the opposed edges of the sheet 341 and openings 346 and tabs 348 so as to enable closure of structure 350. If the structure to be formed needs to be fluid-tight, the bends produced by slits 343 can be adhesively or otherwise filled, for example, by welding or brazing. It is also possible to provide numerous other closure configurations or fastening schemes, including welding along the abutting edges of sheet 341 and overlapping of an edge of the sheet with a side wall and the use of tabs and/or fasteners.

Thus, in a further aspect of the present invention, as schematically shown in FIG. 12, a method is provided for forming a three-dimensional structure which comprises the steps of designing the three dimensional structure at 370 for example, in 3D CAD, selecting a sheet of material at 371; forming bend-facilitating structures, such as slits by using the 3D CAD design to create cutting files for a CNC driven sheet slitter and slitting the sheet of material to enable bending at step 373; transporting the slit material, for example in a coil 339, to a remote location at step 375; bending the sheet precisely along a first bend line at step 377; bending the sheet along at least one additional bend line until two portions of this sheet are abutting at step 377; and coupling together the abutting portions of the sheet to produce a rigid load-bearing three-dimensional structure at step 379.

The slit-base bending method and apparatus of the present invention are capable of highly precise bending tolerances. The original slits can be laid out with extreme precision using a CNC machine to control, for example, a laser, or water jet cutter, or punch and the bends which are produced will be located within ±0.005 inches tolerance while working with macroscopic parts. This is at least as good or better than can be achieved using a press brake and a highly skilled operator. Moreover, when using the slit-based bending scheme of the present invention, the tolerances errors do not accumulate, as would be the case for a press brake. Alternatively, the slits can be cast or molded into a sheet of material or cast three-dimensional member having a sheet-like extension or flap that needed to be folded. While working with materials of near microscopic or microscopic dimensions, other forming methods commonly used in the field of microelectronics and MEMS such a e-beam lithography and etching may be used to effect the required geometry of the present invention with extreme accuracy.

The precision possible enables a sheet of material to be slit at one location and bent at another location, with the bending step not requiring large or sophisticated tools or the skill and care necessary for precise press brake bending. The sheet may be transported to the desired final site for the structure and then the sheet bent along the slitted lines, with the bent structure thean being secured into a three-dimensional structure. Transportation while unbent will tend to reduce damage during shipping, handling and storage.

From the above description it also will be understood that another aspect of the method for precision bending of a sheet material of the present invention includes the step of forming a plurality of longitudinally extending slits in axially spaced relation in a direction extending along and proximate a bend line to define bending webs between pairs of longitudinally adjacent slits. In one embodiment, the longitudinally extending slits are each formed by longitudinally extending slit segments that are connected by at least one transversely extending slit segment. In a second embodiment, the slits have slit end portions which diverge away from the bend line to define bending straps, which are preferably oblique to the bend line. In both embodiments, the slits produce bending about virtual fulcrums with resulting edge-to-face engagement of the sheet material on opposite sides of the slits. The number and length of the bending webs and slits also can be varied considerably within the scope of the present invention. The width or cross sectional area of the bending straps and the transverse divergence of the straps also can be varied independently of the transverse spacing between slits. An additional step of the present method is bending of the sheet of material substantially along the bend line across the bending web.

The method of the present invention can be applied to various types of sheet stock. It is particularly well suited for use with metal sheet stock, such as aluminum or steel, which can have substantial thickness and a variety of tempers (for example, 2 inch carbon steel 6061 Aluminum with a T6 temper, some ceramics and composites). Certain types of plastic or polymer sheets and plastically deformable composite sheets, however, also may be suitable for bending using the method of the present invention. The properties of these materials are relative to a given temperature and fluctuations in temperature may be required to make a particular material suitable in the context of the present invention. The present method and resulting sheets of slit material are particularly well suited for precision bending at locations remote of the slitter. Moreover, the bends may be produced precisely without using a press brake.

Slit sheet stock can also be press brake bent, as well as slit, for later bending by the fabricator. This allows the sheet stock to be shipped in a flat or nested configuration for bending at a remote manufacturing site to complete the enclosure. Press brake bends can be stronger than unreinforced slit bends so that a combination of the two can be used to enhance the strength of the resulting product, with the press brake bends being positioned, for example, along the sheet edges. The slit bends can only be partially bent to open outwardly slightly so that such sheets can still be nested for shipping.

The bent product has overlapping edge-to-face engagement and support. This enhances the ability of the product to withstand loading from various directions without significant stressing of the bending straps. If further strength is required, or for cosmetic reasons, the bent sheet material can also be reinforced, for example by welding the bent sheet along the bend line. It should be noted that one of the advantages of forming slits with essentially zero kerf, is that the bent sheet has fewer openings therethrough along the bend line. Thus, welding or filling along the bend line for cosmetic reasons is less likely to be required.

A further step optional in the method of the present invention is also shown in FIG. 12. The step 374 of mounting, securing or assembling components which are to be contained in the eventual bent sheet, for example, in an enclosure, to the sheet material after it is slit, but before it is bent along the bend lines. Thus, while the sheet is flat and slit for bending, or partially bent and slit for further bending, electronic, mechanical, optical, chemical or other components can be secured, mounted or assembled to the sheet using, for example, pick and place robotic techniques, and thereafter the sheet can be bent along the bend line resulting from slitting. Bending after the components are positioned as desired in the end product allows the component enclosure to be formed around the components, greatly simplifying fabrication of the end product.

It will be noted that while straight line bends have been illustrated, arcuate bends can also be achieved. Thus, each slit can be slightly arcuate. This can be achieved in two manners. One is to layout the identical slits along a curved centerline so the virtual fulcrums fall on the desired curved centerline. The second technique is to shape the slits and bending straps to produce a smooth bend. The bent sheet will have curved surfaces on both sides of the bend line. When stepped slits are used, the longitudinally extending segments can be shortened.

Similarly, flat planes are illustrated in the drawing, but slitting and bending of curved surfaces is also possible, particularly curved surfaces having large radii of curvature. Obviously planar portions of curved structures and three-dimensional objects also can be slit and bent.

The distribution and width of bending straps may vary along the length of a given bend-line for a variety of reasons including a variation in the trade-off between the local force required for bending and the residual strength of the un-reinforced bend. For example, adjacent features that may be opportunistically formed at the same time as the bending straps of the present invention may approach the bend-line so closely that the nearest bending straps are best formed with less frequency near the approaching feature or with thinner straps to maintain planarity of the bent material.

Finally, the bent structures of the present slitting invention can be easily unbent. This allows three-dimensional structures to be disassembled or unfabricated for transport to another site or for recycling of the sheet material. It has been found that the bent sheet material can often be straightened out, or even subject to a bend reversal, and thereafter re-bent through 5 to 10 cycles. This allows bending or fabrication of a structure at one site and then unbending, transportation and re-bending at a second site. The ease of unbending also enables structures to be unbent and sent to a recycling center for reuse of the sheet material and removed components.

What is claimed is:

1. A method of slitting a sheet of material for bending along a bend line comprising the step of:

forming a plurality of slits through the sheet of material, each slit defining opposing faces in the sheet of material and each face having an edge, the slits being configured and positioned relative to the bend line such that an inside edge of one of the faces engages the opposing face and acts as a fulcrum during bending to produce bending along the bend line and to produce edge-to-face engagement of the material on opposite sides of the slits.

2. A method of slitting a sheet of material for bending as defined in claim 1 wherein, during the forming step each slit is formed with the opposing faces of the slit end portions diverging away from the bend line, with a pair of adjacent slit end portions on opposite sides of the bend line defining a bending strap extending across the bend line, and during the forming step, forming the slits with a kerf width dimensioned producing interengagement of the sheet of material on opposite sides of the slits during bending.

3. The method of slitting a sheet of material for bending as defined in claim 2 wherein, the forming step is accomplished by forming each of the slits with slit end portions at oblique angles to the bend line to define an obliquely extending bending strap.

4. The method of slitting a sheet of material for bending as defined in claim 2 wherein, the forming step is accomplished by forming each slit with a circular segment.

5. The method of slitting a sheet of material for bending as defined in claim 2, and the step of:

prior to the forming step, selecting a solid sheet of elastically and plastically deformable material for slitting.

6. The method of slitting a sheet of material for bending as defined in claim 2 wherein, the forming step is accomplished by forming each of the slits in a position to longitudinally overlap along the bend line.

7. The method of slitting a sheet of material for bending as defined in claim 5 wherein,
the forming step is accomplished by forming each slit with an arcuate end portion at each end of the slit to define an obliquely extending bending strap between the end portions of longitudinally adjacent slits.

8. The method of slitting a sheet of material for bending as defined in claim 7 wherein,
the forming step is accomplished by forming the slits to be laterally offset on opposite sides of the bend line with central slit portions substantially parallel to the bend line.

9. The method of slitting a sheet of material for bending as defined in claim 8,
the forming step is accomplished by forming the slits with a kerf producing sliding of edges on one side of the slit on faces on the other side of the slit during bending to position the edges in supporting relation to a face of the sheet of material on opposite sides of the slits.

10. The method of slitting a sheet of material for bending as defined in claim 8, wherein
the forming step is accomplished by forming a plurality of slits as defined in claim 25 on opposite sides of the bend line along substantially the full length of the bend line.

11. The method of slitting a sheet of material for bending as defined in claim 2, and the step of:
after the forming step, bending the sheet of material about the bend line.

12. The method of slitting a sheet of material for bending as defined in claim 8, and the step of:
after the forming step, bending the sheet of material about a virtual fulcrum aligned with the bend line to produce plastic and elastic deformation of the bending strap.

13. The method of slitting a sheet of material for bending as defined in claim 1 wherein,
the forming step is accomplished at a first location, and the steps of:
after the forming step, transporting the sheet of material from the first location to a second location remote of the first location; and
after the transporting step, bending the sheet of material along the bend line at the second location.

14. The method of slitting a sheet of material for bending as defined in claim 13 wherein,
the transporting step is accomplished by transporting the sheet of material in one of:
(a) a flat condition;
(b) a coiled condition; and
(c) a partially formed condition.

15. A method of slitting a sheet of material for bending along a bend line comprising the steps of:
forming, at a first location, a plurality of slits through the sheet of material which are configured and positioned relative to the bend line to produce bending along the bend line and to produce edge-to-face engagement of the material on opposite sides of the slits,
after the forming step, rolling the sheet of material into a coil,
after the rolling step, transporting the sheet of material from the first location to a second location remote of the first location, performing the transporting step while the sheet of material is coiled, and
after the transporting step, bending the sheet of material along the bend line at the second location, and the step of:
uncoiling the sheet of material at another location prior to performing the bending step.

16. The method of slitting a sheet of material for bending as defined in claim 15, and the step of:
during the uncoiling step performing the bending step.

17. The method as defined in claim 16 wherein,
the transportation step is accomplished by transporting the coiled sheet of material from a first location on the surface of the surface of the earth to a second location in outer space.

18. The method as defined in claim 17 wherein,
the bending step is accomplished by bending the sheet of material along a plurality of bend lines to produce a structure having three mutually intersecting planes; and the step of
securing the structure against unbending.

19. The method as defined in claim 11 wherein,
during the forming step, forming a plurality of slits on each of a plurality of intersecting bend lines;
during the bending step, bending the sheet of material along at least two bend lines to produce a structure having three mutually intersecting and abutting planar sheet panels; and the step of:
securing the three mutually intersecting panels in abutting relation for mutual support.

20. The method as defined in claim 8, and the step of:
after the bending step, filling the bent sheet of material at the slits by one of a welding, brazing, soldering and adhesive filling step.

21. The method as defined in claim 2, and the step of varying the cross sectional area of the bending strap by changing at least one of the jog distance between slits and the position of the slits along the bend line.

22. A method of slitting a sheet of material for bending along a bend line, the material having a thickness, the method comprising the steps of:
selecting a solid elastically deformable sheet of material for slitting; and
forming a plurality of slits along a desired bend line with alternate slits along the bend line being positioned on alternating sides of the bend line and during the forming step, forming each slit with a central portion substantially parallel to and offset laterally from the bend line and with arcuate slit end portions on each end of the slit curving away from the bend line so that adjacent pairs of arcuate slits define bending straps extending obliquely across the bend line, wherein a jog distance between alternate slits is less than the material thickness.

23. The method as defined in claim 22 wherein,
the forming step is accomplished using a laser cutting apparatus to cut slits having a kerf width dimensioned to produce interengagement of the sheet on opposite sides of the slits during bending.

24. The method as defined in claim 22 wherein,
the forming step is accomplished using a water jet cutting apparatus to cut slits having a kerf width dimensioned to produce interengagement of the sheet on opposite sides of the slits during bending.

25. The method as defined in claim 22, and the step of:
after the forming step, bending the sheet of material along the bend line.

26. The method as defined in claim 25 wherein,
the forming step is accomplished by forming the slits with a kerf width dimension producing sliding interengagement of an edge of the sheet of material on one side of the slit with a face of the sheet of material on the other side of the sheet of material; and the bending step is accomplished by bending the sheet of material about a virtual fulcrum substantially aligned with the bend line so that sliding interengagement of edges and faces of the sheet of material produces plastic and elastic deformation of the bending straps.

27. The method as defined in claim 26 wherein, the forming step is accomplished by forming the slits along a plurality of intersecting bend lines; and the bending step is accomplished by bending the sheet of material into a three-dimensional structure having three intersecting planar areas extending into abutting relation; and the step of securing the three intersecting planar areas to secure them together.

28. The method as defined in claim 26 wherein, the bending step includes bending the sheet of material into a three-dimensional structure having three planar areas; and the step of securing the three planar areas in abutting relation to rigidify the structure.

29. The method as defined in claim 25, and the step of:

after the bending step, filling the slits with a material producing a sealed joint at the bend line.

30. The method of claim 29 wherein, the filling step is accomplished by one of:

(a) welding;
(b) brazing;
(c) soldering; and
(d) adhesive filling.

31. The method of claim 22 wherein, the forming step is accomplished to provide slits defining bending straps oriented relative to the bend line in oppositely extending oblique angles.

32. The method of claim 31 wherein, the forming step is accomplished to provide bending straps oriented relative to the bend line at angles of about 45 and about 135 at opposite ends of a slit.

33. The method of claim 25, and the step of:

after the bending step, unbending the sheet of material.

34. The method as defined in claim 22 wherein, the forming step is accomplished by forming each slit with a central portion offset laterally from the bend line at a distance that is approximately 0.5 times the material thickness.

35. The method as defined in claim 22 wherein, the forming step is accomplished by forming each slit with a central portion offset laterally from the bend line at a distance that is approximately 0.3 times the material thickness.

36. A method of slitting a sheet of material for bending along a bend line comprising the step of:

forming a plurality of slits through the sheet of material, each slit defining opposing faces in the sheet of material and each face having an edge, the slits being configured and positioned relative to the bend line such that an inside edge of one of the faces engages the opposing face and acts as a fulcrum during bending to produce bending along the bend line and to produce edge-to-face engagement of the material on opposite sides of the slits, each slit having a longitudinally extending centerline, wherein each centerline at the end portion thereof diverges away from the bend line.

37. The method an defined in claim 36 wherein, the forming step is accomplished by forming each slit with a central portion offset laterally from the bend line at a distance that is less than the material thickness.

38. The method as defined in claim 36 wherein, the forming step is accomplished by forming each slit with a central portion offset laterally from the bend line at a distance that is less than approximately 0.5 times the material thickness.

39. The method as defined in claim 36 wherein, the forming step is accomplished by forming each slit with a central portion offset laterally from the bend line at a distance that is less than approximately 0.3 times the material thickness.

40. A method of slitting a sheet of material for bending as defined in claim 36 wherein, during the forming step each pair of adjacent face end portions on opposite sides of the bend line define a bending strap extending across the bend line, and during the forming step, forming the slits with a kerf width dimensioned producing interengagement of the sheet of material on opposite sides of the slits during bending.

41. The method of slitting a sheet of material for bending as defined in claim 40, and the step of prior to the forming step, selecting a solid sheet of elastically and plastically deformable material for slitting.

42. The method of slitting a sheet of material for bending as defined in claim 40 wherein, the forming step is accomplished by forming each of the slits in a position to longitudinally overlap along the bend line.

43. The method of slitting a sheet of material for bending as defined in claim 36 wherein, the forming step is accomplished by forming the slits to be laterally offset on opposite sides of the bend line with central slit portions substantially parallel to the bend line.

44. The method of slitting a sheet of material for bending as defined in claim 43, wherein each opposing face has an edge, and the forming step is accomplished by forming the slits with a kerf producing sliding of edges on one side of the slit on respective opposing faces of the slit during bending to position the edges in supporting relation to a face of the sheet of material on opposite sides of the slits.

45. The method of slitting a sheet of material for bending an defined in claim 43, wherein the forming step is accomplished by forming a plurality of slits on opposite sides of the bend line along substantially the full length of the bend line.

46. The method of slitting a sheet of material for bending as defined in claim 40, and the top of:

after the forming step, bending the sheet of material about the bend line.

47. The method of slitting a sheet of material for bending as defined in claim 43, and the step of:

after the forming step, bending the sheet of material about a virtual fulcrum aligned with the bend line to produce plastic and elastic deformation of the bending strap.

48. The method of slitting a sheet of material for bending as defined in claim 36 wherein, the forming step is accomplished at a first location, and the steps of:

after the forming step, transporting the sheet of material from the first location to a second location remote of the first location; and after the transporting step, bending the sheet of material along the bend line at the second location.

49. The method of slitting a sheet of material for bending as defined in claim 48 wherein, the transporting step is accomplished by transporting the sheet of material in one of (a) a flat condition;

(b) a coiled condition; and (c) a partially formed condition.

\* \* \* \* \*

UNITED STATES PATENT AND TRADEMARK OFFICE
CERTIFICATE OF CORRECTION

PATENT NO. : 6,877,349 B2  Page 1 of 1
APPLICATION NO. : 10/256870
DATED : April 12, 2005
INVENTOR(S) : Durney et al.

It is certified that error appears in the above-identified patent and that said Letters Patent is hereby corrected as shown below:

In column 21, line 23, claim 1, replace "slits as defined in claim 25 on opposite sides of the bend" with --slits as defined in claim 1 on opposite sides of the bend--.

Signed and Sealed this

Eleventh Day of December, 2007

JON W. DUDAS
*Director of the United States Patent and Trademark Office*